United States Patent [19]

Droppleman et al.

[11] Patent Number: 4,597,137
[45] Date of Patent: Jul. 1, 1986

[54] HINGE PIN AND HINGE PIN TOOL

[75] Inventors: J. Patrick Droppleman, Lincolnshire; Iner C. Olson, Lombard; Jeffrey S. Phillip, Wildwood; Steven K. Berning, Evanston, all of Ill.

[73] Assignee: Ocenco Incorporated, Northbrook, Ill.

[21] Appl. No.: 649,749

[22] Filed: Sep. 12, 1984

[51] Int. Cl.⁴ ............................................. F16G 3/02
[52] U.S. Cl. ............................... 24/33 P; 24/31 R; 24/33 B; 24/33 M; 81/459
[58] Field of Search ............... 24/33 P, 33 C, 33 R, 24/33 B, 33 F, 33 M, 31 R, 31 H, 31 W, 573, 574; 81/459

[56] References Cited

U.S. PATENT DOCUMENTS

| 1,444,301 | 2/1923 | Bukovecz | 24/33 M |
| 1,633,939 | 6/1927 | Grace | 24/33 P |
| 1,653,625 | 12/1927 | Gingras | 24/33 B |
| 2,044,392 | 6/1936 | Lord | 24/33 P |
| 2,048,256 | 7/1936 | Geyer | 24/33 P |
| 2,202,250 | 5/1940 | Freedlander et al. | 24/33 B |
| 2,649,631 | 8/1953 | Rice | 24/33 M |
| 2,962,782 | 12/1960 | Beach | 24/33 B |
| 3,664,490 | 5/1972 | Maruyama | 24/31 R |
| 4,023,239 | 5/1977 | Stolz | 24/33 P |
| 4,315,349 | 2/1982 | Stolz | 24/33 P |

FOREIGN PATENT DOCUMENTS 107240 5/1939 Australia ............................. 81/459

Primary Examiner—Victor N. Sakran
Attorney, Agent, or Firm—Woodling, Krost, Rust

[57] ABSTRACT

A hinge pin construction for connecting the free ends of a conveyor belt. The hinge pin includes a plurality of bushings arranged end to end and having aligned bores through each. A cable extends through the bores and is connected at opposite ends to a termination bushing. The bushings are free to rotate relative to the cable. This construction extends through aligned eyes in a mechanical splice connected to each of the free ends of the conveyor belt. A hinge pin tool is provided to assemble and disassemble the hinge pin.

7 Claims, 9 Drawing Figures

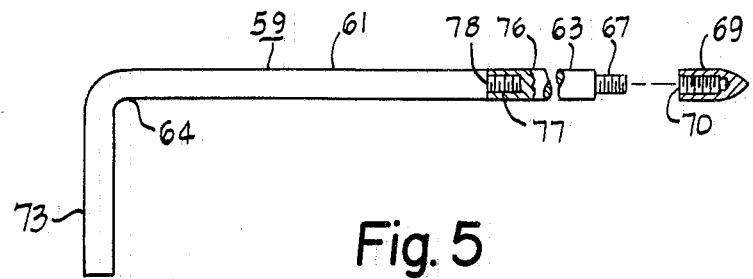
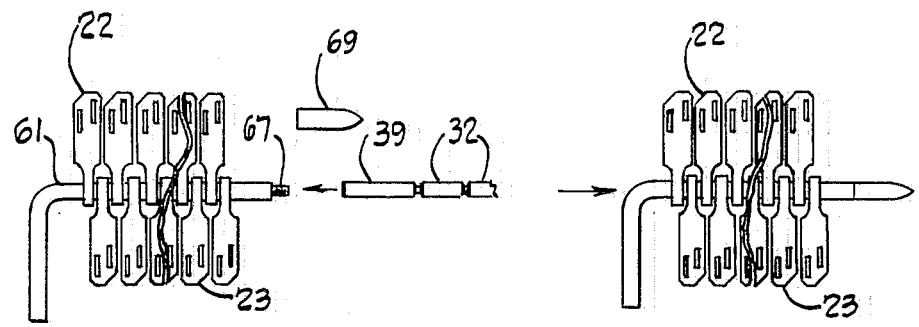
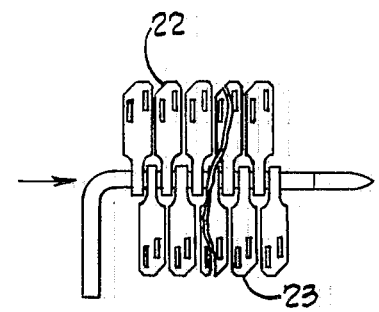
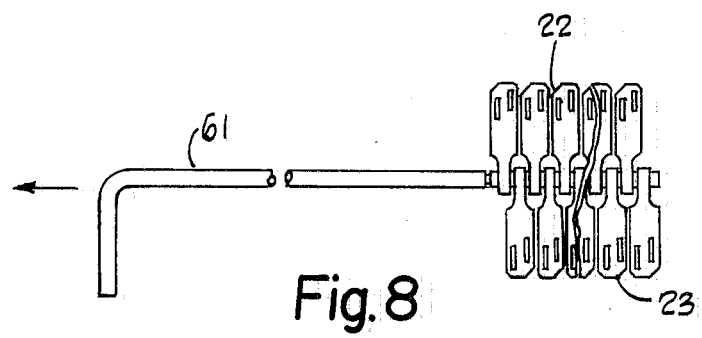
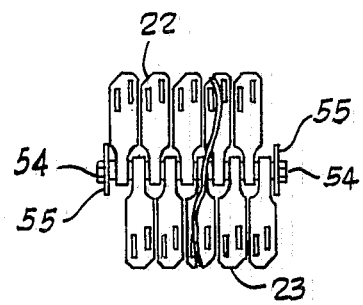

HINGE PIN AND HINGE PIN TOOL

The invention relates to a hinge pin used to join mechanical splices which are commonly attached to the free ends of a conveyor belt or the like thereby forming a flexible hinge in a continuous belt. Included is a hinge pin tool that installs and removes the hinge pin and provides a means of aligning the mechanical splices prior to joining them with the hinge pin.

BACKGROUND OF THE INVENTION

The invention is related to known hinge pins for joining the free ends of conveyor belts, such as U.S. Pat. No. 4,023,239. While it is recognized that the placing of sleeves on a wire rope type cable reduces frictional wear on the cable, shear forces are still exerted on the cable due to each sleeve being loaded from only one direction. In addition, known art that involves sleeves to be placed on a wire rope results in expensive hinge pins due to the special configuration previously assumed to be required.

A common failure mode of known mechanical splices is the breaking of the outer wires of the wire rope due to frictional wear and shear forces exerted by the mechanical splice hinge eye elements. Due to these unbalanced shear forces the internal cable will be loaded and as a result will fail by fraying. It should be noted that cable as commonly found in hinge pins is clearly designed for strength in tension, not in shear. A frayed wire rope cannot easily be removed from the mechanical splice. It is therefore typical that the entire mechanical splice is cut out of the belt and a new one installed, involving costly down time for the conveying system and often loss of a functional mechanical splice.

Due to the large volume of coal or product on the conveyor belts and the high speed at which it is being conveyed, it is necessary that the splice be inspected and replaced prior to failure. This pending failure is not easily detected when the wear is internal, as found in known hinge pins. The provision to detect wear on the hinge pin is further emphasized when a means of easily installing or removing the hinge pin is provided.

Objects of the present invention are to solve the problems of:

1. short hinge pin life by making the hinge pin bushing wall, or bearing surface, substantially thick and the flexible wire rope substantially narrow;
2. shear loading forces on the wire rope by placing all shear forces on the hinge pin bushings in a balanced manner;
3. frictional wear on the wire rope, by allowing the hinge pin bushings to rotate freely about the wire rope by a bore in the bushings, through which the wire rope passes, sufficiently larger than the wire rope;
4. aligning, installing and removing the hinge pin is solved by providing a hinge pin tool which can be easily inserted in the mechanical splice and which mechanically attaches to the hinge pin;
5. relative high cost of hinge pins, by employing a hinge pin bushing design that can be manufactured at high rates of speed on a common multi-spindle screw machine;
6. pressure outward on the hinge pin termination bushings commonly generated by the hinge pin bushings, by proper spacing between the hinge pin bushings; and
7. hinge pins drifting laterally within the mechanical splice hinge eye elements, by securing retaining rings or washers to the ends of the hinge pin.

Other objects and a fuller understanding of this invention may be had by referring to the following description and claims, taken in conjunction with the accompanying drawings, in which:

FIG. 5 is an elevational view of the hinge pin tool of the present invention;

FIGS. 6–8 are progressive illustrations of the use of the hinge pin tool of FIG. 5 in assembling the hinge pin shown in FIG. 1; and FIG. 9 is a view similar to FIG. 1 showing an assembled hinge pin securing the mechanical splices connected to the free ends of a conveyor belt.

Figure 3:
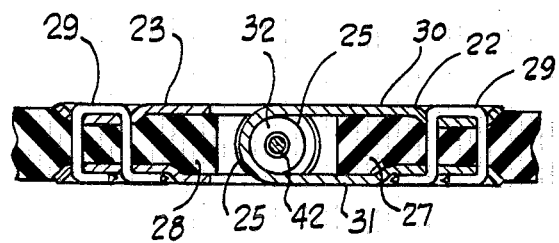
FIG. 3 is a view taken generally along the line 3—3 of FIG. 1 and illustrating the ends of the conveyor belt.

The hinge pin construction of this invention is indicated generally by the reference numeral 20 and as illustrated serves to pivotally connect a first 22 and second 23 plurality of alternately arranged splice clips which are respectively connected to opposed free ends 27, 28 of a conveyor belt. The splice clips are shown connected to the respective ends of the belt in FIG. 3 in a conventional manner and each includes an eye or cylindrical portion 25 through which the hinge pin of the present invention extends. This serves to make the belt continuous. Staples 29 (FIG. 3) cooperate with each clip 22, 23 by extending through openings in a top leg 30 of the clip, through the belt and thereafter through openings in a bottom leg 31 of the clip. The staples are bent over as shown adjacent the leg 31 to securely enclose the clip to the belt.

Figure 1:
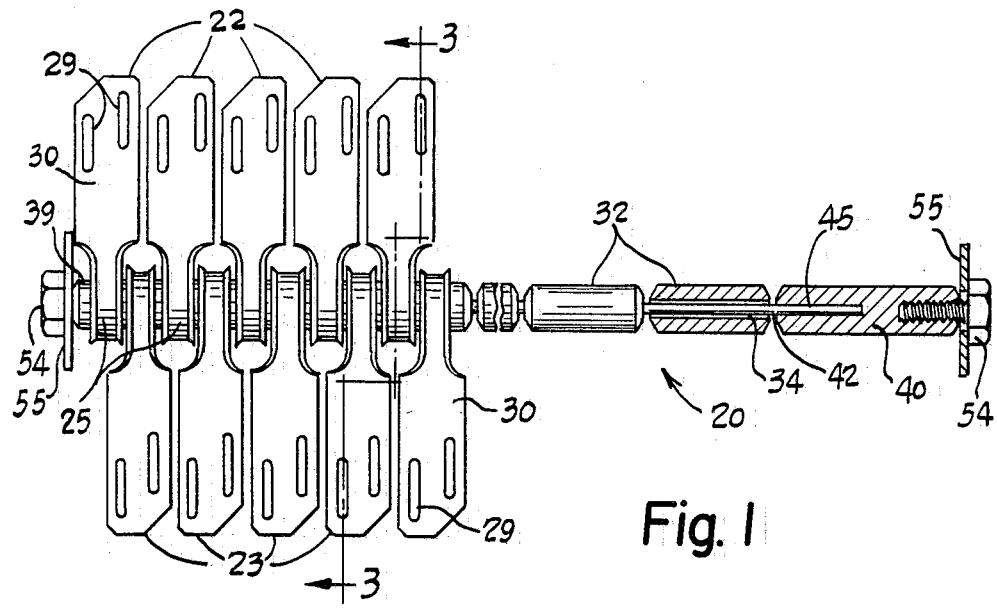
FIG. 1 is a plan view, partially in section, illustrating the hinge pin of the invention securing the mechanical splices which are connected to opposed free ends of a conveyor belt. The ends of the conveyer belt have been omitted from this view and have been illustrated in FIG. 3.
Figure 2:
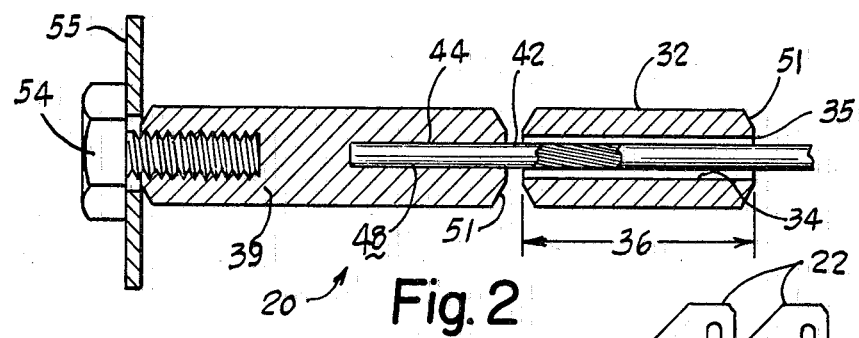
FIG. 2 is an enlarged fragmentary view of the hinge pin of the present invention omitting the mechanical splices shown in FIG. 1.

The hinge pin is comprised of a plurality of hinge pin bushings 32 best illustrated in FIG. 2 of a given length 36 arranged in end to end relationship as shown in FIGS. 1 and 7. Each bushing 32 has a bore 34 with generally square ends 35 the corners of which are chamfered as at 51. First 39 and second 40 hinge pin termination bushings are provided at each end of the arranged bushings 32 and serve to secure the opposed ends 44, 45 of a wire rope type cable which extends through the bores 34 in the bushings 32. The connections at 44, 45 are swaged but might be by welding, brazing, adhesives or by any of a number of mechanical fasteners.

As illustrated the cable 42 is of smaller size than bores 34 and not otherwise connected to the bushings enabling free rotation of the bushings 32 relative to the cable.

Figure 4:
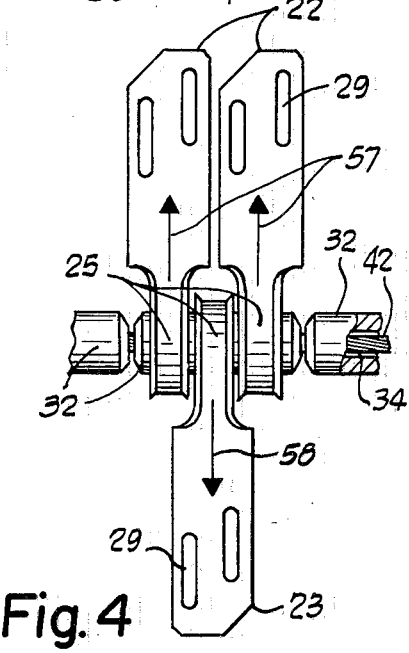
FIG. 4 is a fragmentary view for use in illustrating the shear loading on the hinge pin construction.

FIG. 4 illustrates that the length 36 of a hinge pin bushing is long enough to span or extend the axial length of at least three aligned and adjacent eyes 25. The load on the hinge pin bushing in one direction is illustrated by arrow 57 and in the other direction by arrow 58. With this construction all of the shear loading forces are placed on the bushings 32 and not on the cable 42. This contributes substantially to the life of the hinge pin since the bushings have great strength in shear as distinguished from a wire rope type cable.

The bushings 32 arranged on the cable are provided with a small amount of space between each and this in combination with the chamfers allows for so-called "troughing" of the belt across its width because of the action of the troughing idlers without applying unacceptable forces on the hinge pin termination bushings.

Each of the hinge pin termination bushings 39, 40 is threaded to receive a termination bolt 54 which secures a washer 55 and these washers 55 engage a clip 22, 23 at opposed ends of the belt splice to secure the hinge pin and splice clips relative to each other.

The hinge pin tool 59 and its use is illustrated in FIGS. 5-8. The tool 59 comprises an elongated relatively rigid rod 61 of circular cross-section having first 63 and second 64 end portions and a length at least as great as the length of the mechanical splice to be made. The first end portion 63 of the rod is provided with male threads 67 which enable a point member 69 to be removably attached thereto by means of female threads 70 in the point member. The second end portion 64 of the rod 61 is provided with a transverse portion 73 which extends laterally to the extent of the rod and is for the purpose of enabling the user to apply axial and/or rotative force to the tool. FIG. 5 illustrates that the tool 59 may be comprised of an additional part 76 connected to the other part by male 77 and female 78 threads.

It will be appreciated by those skilled in the art that the eyes 25 of the respective clips 22, 23 as attached to the respective ends of a belt will not be perfectly aligned prior to the hinge pin being assembled. With this in mind the point member 69 of tool 59 is (FIG. 6) urged through the eyes 25 to perfectly align the eyes. Next the point member is removed from the rod (FIG. 7) and the threads 67 are threadedly attached to the female threads in a hinge pin termination bushing (39 or 40) which is subsequently to receive a bolt 54. FIG. 8 illustrates the tool 59 then being used to pull the components of the hinge pin construction into axial position in the aligned eyes 25. The tool is then threadably disconnected from the termination bushing and the bolts and washers 55 are applied to the termination bushings 39 and 49 as seen in FIG. 9 which secures the hinge pin 20 and clips 22, 23 in assembled position relative to each other. In a similar manner an assembled hinge pin can be disassembled.

It will thus be seen from the above description that the objects of the invention are conveniently carried out and the disadvantages of the prior art are obviated. The bushings 32, 39 and 40 are of sturdy construction and can be economincally mass produced. The cooperation between the bushings, cable and clip eyes places the shear forces on the bushings rather than on the cable resulting in a long hinge pin life. The hinge pin tool as described efficiently aligns the clip eyes and easily assembles and disassembles the hinge pin construction.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A hinge pin construction for use in connecting the aligned hinge eyes of a first and second plurality of alternately arranged splice clips which first and second plurality of splice clips are respectively connected to opposed free ends of a belt or the like to make the belt continuous including in combination a plurality of hinge pin bushings arranged end to end and extending through the aligned hinge eyes of the first and second plurality of splice clips, each of said hinge pin bushings having a bore extending therethrough and having a given length, first and second hinge pin termination bushings located at opposite ends of said arranged hinge pin bushings, a flexible cable having first and second end portions and extending through said bores in said arranged hinge pin bushings, said cable having a smaller diameter than said bores and being unattached to said hinge pin bushings to permit rotation of said hinge pin bushings on said cable, said first and second end portions of said flexible cables being respectively fixedly connected to said first and second hinge pin termination bushings, said given length of a hinge pin bushing being long enough to span the length of at least three aligned and adjacent hinge eyes, the ends of said hinge pin bushings being chamfered and the total of said given lengths of said hinge pin bushings being slightly less than the length of said cable between the ends of said first and second hinge pin termination bushings, and means connected to said first and second hinge pin termination bushings to retain and locate the splice clips on said hinge pin.

2. A hinge pin construction to join mechanical splices attached to the free ends of a conveyor belt or the like which mechanical splices include clip members having eyes with the clip members from opposite free ends being alternately arranged with each other and with their eyes aligned, said hinge pin construction extending through the aligned eyes of the clip members and including a plurality of hinge pin bushings arranged end to end, each hinge pin bushing having a bore extending therethrough, a cable having first and second end portions and extending through the bores of said end to end arranged hinge pin bushings, said cable having a smaller size than said bores and being unattached to said hinge pin bushings to permit rotation of said hinge pin bushings on said cable, and means for fixedly positioning said first and second end portions of said cable at opposite ends of the mechanical splices.

3. A hinge pin construction as claimed in claim 2 wherein the length of a hinge pin bushing is at least as long as three aligned eyes in adjacent clip members.

4. A hinge pin construction as claimed in claim 3 wherein the effective length of said cable is slightly greater than the length of said plurality of end to end arranged bushings so that a slight spacing is effected between the ends of adjacent bushings.

5. A hinge pin construction as claimed in claim 4 wherein the ends of said bushings are chamfered.

6. A hinge pin construction as claimed in claim 2 wherein said means for fixedly positioning said first and second end portions of said cable includes at each end portion a hinge pin termination bushing fixedly receiving and holding an end of said cable.

7. A hinge pin construction as claimed in claim 6 wherein a washer member is secured to an end of said hinge pin termination bushing by means of a threaded member and said washer member is adapted to engage a clip member.

* * * * *